(No Model.) 3 Sheets—Sheet 1.
J. F. KAY & D. HUTCHINSON.
MACHINE FOR CUTTING AND ASSEMBLING MATCH SPLINTS.
No. 601,893. Patented Apr. 5, 1898.
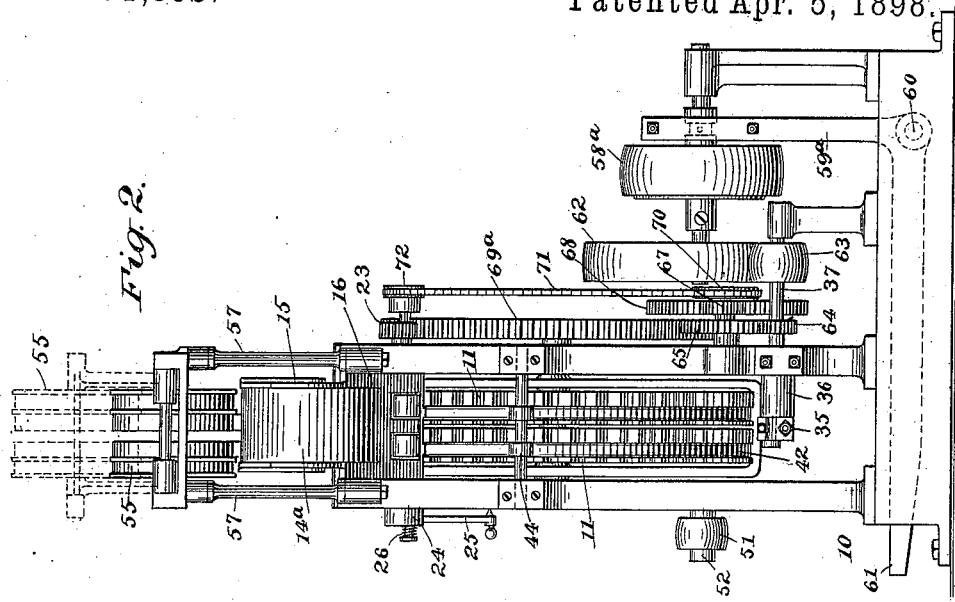
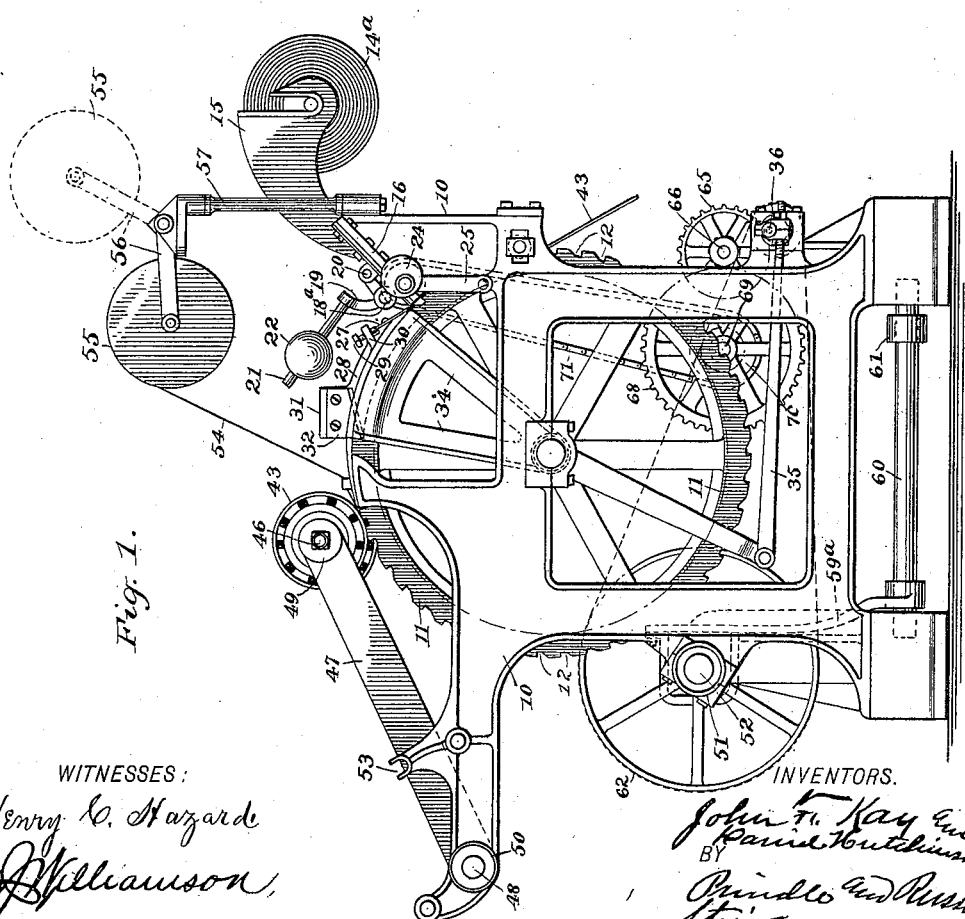
WITNESSES:
Henry C. Hazard
G. J. Williamson
INVENTORS.
John F. Kay
Daniel Hutchinson
BY Pindle and Russell
their ATTORNEYS.

(No Model.) 3 Sheets—Sheet 2.
J. F. KAY & D. HUTCHINSON.
MACHINE FOR CUTTING AND ASSEMBLING MATCH SPLINTS.
No. 601,893. Patented Apr. 5, 1898.
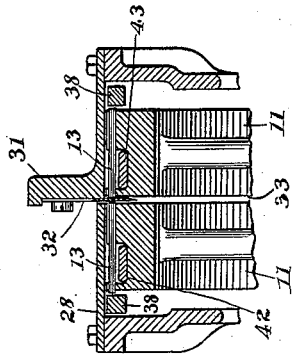
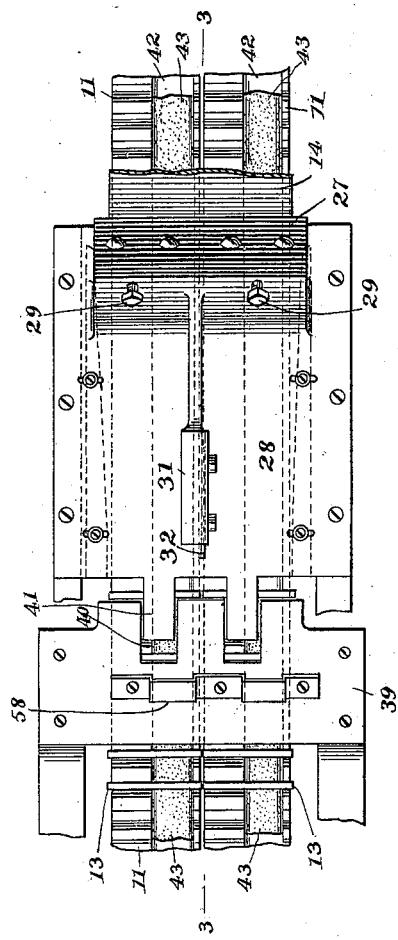
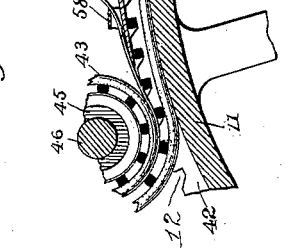
WITNESSES: INVENTORS.
BY
ATTORNEYS.

(No Model.) 3 Sheets—Sheet 3.
J. F. KAY & D. HUTCHINSON.
MACHINE FOR CUTTING AND ASSEMBLING MATCH SPLINTS.
No. 601,893. Patented Apr. 5, 1898.
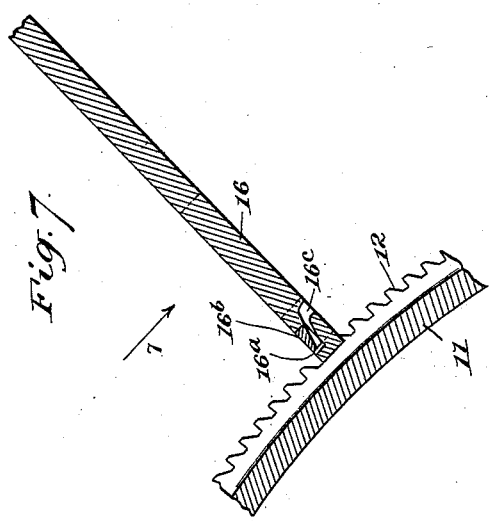
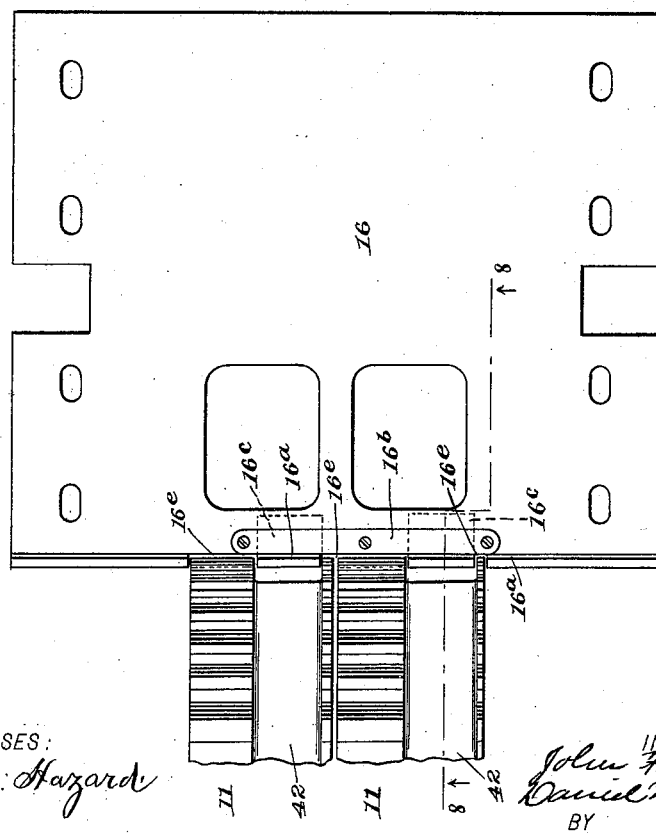

UNITED STATES PATENT OFFICE.

JOHN F. KAY, OF PASSAIC, AND DANIEL HUTCHINSON, OF BOUND BROOK, NEW JERSEY, ASSIGNORS TO THE DIAMOND MATCH COMPANY, OF CHICAGO, ILLINOIS.

MACHINE FOR CUTTING AND ASSEMBLING MATCH-SPLINTS.

SPECIFICATION forming part of Letters Patent No. 601,893, dated April 5, 1898.

Application filed September 3, 1897. Serial No. 650,461. (No model.)

*To all whom it may concern:*

Be it known that we, JOHN F. KAY, of Passaic, in the county of Passaic, and DANIEL HUTCHINSON, of Bound Brook, in the county of Somerset, State of New Jersey, have invented certain new and useful Improvements in Machines for Cutting and Assembling Match-Splints, of which the following is a full, clear, and exact description.

Our invention relates to improvements in match-making machinery; and the object of our invention is to produce a comparatively simple machine which is adapted to cut match-splints from veneer, which is arranged to collect the splints in coils as fast as they are cut, and which is adapted to operate without waste of material.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of our improved machine. Fig. 2 is a front elevation of the same. Fig. 3 is an enlarged detail section on the line 3 3 of Fig. 4 and shows the cutting and coiling mechanism. Fig. 4 is a plan view of the detail mechanism for cutting and coiling. Fig. 5 is a cross-section on the line 5 5 of Fig. 3. Fig. 6 is a broken detail plan view of a portion of the toothed wheels and the feed-table, the mechanism of the latter being removed; and Fig. 7 is a detail vertical section on the line 8 8 of Fig. 6.

The machine has a frame 10, which can be of any suitable form, and on it are journaled the parallel transversely-grooved wheels 11, which have transverse grooves 12, each adapted to receive a match-splint 13. These grooves have their forward sides beveled or inclined, as shown clearly in Fig. 3, so that the veneer sheet 14, from which the splints are cut, can be readily fed into them. The straight or abrupt rear sides of the grooves will, when the veneer is fed into the latter, serve as abutments to support the veneer in opposition to the pressure of the cutting-off knife, to be hereinafter referred to.

The veneer can be fed in any suitable way; but it is usually arranged in a roll $14^a$, which is held in a supporting-bracket 15 above the machine-frame and is fed forward against the grooved wheels 11, over a feed-table 16, by the feed-rolls 17 and 18, (see Fig. 3,) which impinge on the upper and lower sides of the veneer. The upper feed-roll 18 is preferably journaled on bent arms 19, which are pivoted, as shown at 20, to the table 16 and have extensions 21, carrying weights 22 to hold the upper feed-roll down against the veneer. The object of this arrangement is to enable the upper roll to be lifted by swinging up the arms 19, so that the knife, to be presently referred to, can be easily gotten at in case the veneer should clog. The feed-rolls are geared together by the gear-wheels 23, (see Fig. 2,) so that they turn in unison, and the upper feed-roll has a projecting end $18^a$, which is adapted to engage an eccentric 24, (see Fig. 1,) loosely mounted on the shaft of the lower feed-roll and provided with a lever 25, so that by turning the handle and eccentric the upper feed-roll can be lifted. The eccentric is pressed inward, so as to contact with the extension $18^a$, when rotated by a spring 26, as shown in Fig. 2.

The depth of the recesses 12 of the toothed wheels 11 corresponds to the thickness of the match-splints 13, and as the veneer is fed into the grooves it is cut off by a rapidly-moving knife 27, (see Fig. 3,) which reciprocates over the face of the grooved wheels and cuts into the groove $16^a$ of the feed-table 16, the knife being secured to the sliding head 28, which fits closely over the grooved wheels and serves as a guard to prevent the displacement of the splints. In order that the splints may be cut smoothly, the table 16 is provided with a groove $16^a$ near its lower edge, which receives the edge of the knife 27, and the latter cuts by a hardened plate $16^b$, which is fastened to the table 16, so that the face of the plate is flush with the face of the table, and the knife thus cuts by the edge of the plate like a shear and smoothly severs the wood. In cutting some kinds of wood particles work off the wood and stick in the groove, and for this reason the groove is relieved by a slot or channel 16$^c$, extending from near the front of the plate 16$^b$ through the back of the table, as shown best in Fig. 7, this relief-channel occurring at points opposite the grooved wheels 11 only, as the veneer is no wider than the width of the two wheels. In order that the groove 16$^a$ may be practically level with the faces of the teeth 12, the table is recessed at its lower edge, as shown at 16$^d$, so that it may sit down over the wheels snugly and bring the groove 16$^a$ to the right position in relation to the knife. It is obvious that the plate 16$^b$ can be dispensed with without changing the principle of the cutting mechanism or that the knife can be made to cut straight by the lower edge of the table, if preferred; but we find the groove and hardened plate desirable.

The knife 27 is backed in the ordinary way by adjusting-screws 29, which project through a flange 30 on the head 28. The head 28 is ribbed to give it additional strength, and on it, near the rear end, is a bracket 31, carrying a cutting-off knife 32, which slides in the space 33 between the grooved wheels, (see Figs. 3 and 4,) and in this connection it will be understood that a single grooved wheel with a groove for the knife can be used, if desired, or that the wheel can be extended so as to receive any desired number of lengths of match-splints. It will also be understood that any other suitable cutting-off knife can be substituted for the knife shown.

The sliding head 28 and the knives which it carries are actuated by a fork 34, to which the head is secured, this fork straddling the grooved wheels 11 and being fulcrumed on the journal of the wheels, while its lower end connects by a pitman 35 (see Fig. 1) with a crank 36 on the counter-shaft 37, which, together with the other moving parts of the machine, is actuated as hereinafter described. It will be seen that the oscillation of the fork 34 causes the head 28 and the knives 27 and 32 to reciprocate rapidly on the face of the grooved wheels 11, so that the knife 27 splits the splints from the advancing veneer 14, while the knife 32 cuts off the splints into suitable match lengths, the machine illustrated being adapted to cut two lengths of splints— that is, two series and two coils, as hereinafter described—but it will be clearly seen that a greater number of coils can be simultaneously cut, if desired, by simply using additional grooved wheels and accessory mechanism.

To prevent any possible endwise movement of the splints, guards 38 are placed opposite the outer ends of the grooved wheels, near their periphery, as shown clearly in Fig. 5.

Just back of the sliding head 28 and behind the cutting-off knife 32 is a shield 39, which fits closely over the face of the grooved wheels to prevent any displacement of the splints, and in order that no part of the wheels shall be uncovered until the coil is reached, as described presently, the shield 39 has recesses 40, receiving tongues 41 on the head 28, (see Fig. 4,) and when the head moves forward the tongue will still be held in the grooves and the splints cannot be displaced.

The wheels 11 are provided with circumferential grooves 42, (see Fig. 3,) which receive coiling belts 43, and the grooves are deep enough to permit the belts to lie below the transverse grooves 12, and so the splints 13 as they are cut are delivered upon the belts and are taken off the wheels by the belts when the latter are coiled. The belts 43 are delivered to the machine in the usual way and pass beneath guide-rolls 44, (see Figs. 1 and 2,) after which they enter the grooves 42, just referred to, and after passing by the knives 27 and 32 and beneath the shield 39 the belts are wound up in precisely the usual way on centers 45, which are carried on a shaft 46, the latter being arranged like the ordinary coiling-shaft on swinging arms 47, which are journaled on the machine-frame, as shown at 48. The shaft 46 has a pulley 49 (see Fig. 1) alining with a pulley 50 at the joint 48, and this alines with a pulley 51 on the shaft 52, (see Fig. 1,) so that the coiling-shaft can be run by belts in the usual way; but the coil is turned principally by reason of its weight as it lies on the grooved wheel 11.

The frame 10 has the usual sockets 53 near the arms 47, so that when the coils are raised a cross-bar can be held in the sockets to hold up the arms 47. There is nothing new claimed for the coiling mechanism in itself, except in the combination with the cutting mechanism shown.

Just as the splints pass from beneath the shield 39 they come in contact with the ordinary binding-tape 54, which is rolled up in the coil, (see Fig. 3,) and the splints are thus bound in the ordinary way to prevent them from sliding endwise out of the coil. The tape 54 is held on spools 55, journaled on swinging arms 56, which are pivoted on a supporting-bracket 57, and the spools can be tipped forward, as shown by dotted lines, to permit the adjustment of the splints. This mechanism is not particularly new and is not claimed or shown in detail. Just before the tape enters the coil it passes through a keeper 58 on the shield 39, which serves as a guide.

The machine can be driven in any suitable way, and we have illustrated driving mechanism which is adapted for the purpose, but which can be departed from without affecting the principle of the invention. As shown, the machine has a driving-pulley 58$^a$, which is an ordinary clutch-pulley, operated by a crank-arm 59$^a$ on the shaft 60, so that the machine can be stopped and started at will, and the shaft 60 is a rock-shaft and is tilted by the treadle 61. On the driving-shaft connected with the pulley 58$^a$ is a pulley 62, from which a belt runs to a pulley 63 on the counter-shaft 37 already referred to, and this counter-shaft connects by gears 64 and 65 with a second counter-shaft 66, and the latter connects by gears 67 and 68 with a third shaft 69, which is geared to the gear-wheel $69^a$, driving the grooved wheels 11. The shaft 69 has also a sprocket-wheel 70, connected by a sprocket-chain 71 with a sprocket-wheel 72 on the lower feed-roll 17, and thus all the moving parts of the machine are driven and can be timed so that the machine will be properly speeded. We have not attempted to show the driving mechanism in great detail, because obviously this is a simple matter and can be accomplished in many ways.

Referring now to Figs. 1 and 3, the operation is as follows: The veneer 14 is fed from the roll between the feed-rolls 17 and 18 into the grooves of the wheels 11 which are rotating, and the knife 27, which is carried by the head 28, reciprocates rapidly and cuts off a splint as fast as the veneer is fed into the wheels. The splints are double length when cut from the veneer, and as they reach the cutting-off knife 32 the latter cuts them off into single splints. When the splints are delivered to the grooved wheels, they lie on belts 43, which have previously been fitted into the grooves 42, and the splints, belts, and tapes 54 are rolled up in coils, as already described. The coils are then removed from the shaft 46 in the usual way, and the splints dried and dipped.

Having thus described our invention, we claim as new and desire to secure by Letters Patent—

1. In combination with a movable splint-carrier having a series of splint receiving and holding devices adapted to hold the splints in a position transverse to the line of travel of the carrier, means for moving the carrier, means for feeding a strip or sheet of veneer toward the carrier and into its splint receiving and holding devices, as such devices are brought successively up to the path of the veneer, so that the forward end of such veneer, will lie transversely, with reference to the carrier, in each holding device into which it is fed and a cutting device operating close to the face of the carrier to cut off from the rest of the veneer the portions of the latter projecting into the receiving and holding devices of the carrier, substantially as described.

2. In combination with a movable splint-carrier having a series of transverse grooves to hold the splints, means for feeding the veneer into such grooves, so that its forward edge, extending in a direction transverse to the carrier, will project into the grooves as they are brought, by the movement of the carrier, to a certain point, and a cutting device to cut off the portions of the veneer projecting into the carrier-grooves, substantially as and for the purpose described.

3. In combination with a movable splint-carrier having a series of transverse splint-holding grooves, a suitable way or support for a strip of veneer, feed mechanism to feed the veneer forward into each groove in the carrier, as such groove is brought by the movement of the carrier into position in front of the veneer, so that the forward edge of the veneer, extending in a direction transverse to the carrier, will be seated in the groove and means for cutting the veneer, close to the face of the carrier after the veneer has been moved into a groove in the carrier, substantially as and for the purpose described.

4. In combination with a suitable table for supporting a sheet of veneer, a movable carrier with transverse splint-holding grooves moving past such table, means for feeding the veneer forward, with its forward edge transverse to the carrier to cause it to project into the grooves in the carrier, as they are successively brought, by the motion of the carrier, into position opposite the end of the veneer, and a reciprocating knife acting close to the face of the carrier to cut off from the veneer each portion thereof projected into a groove in the carrier, substantially as and for the purpose described.

5. In combination with a movable splint-carrier, having a series of transverse splint-holding grooves, and a tape-receiving groove at right angles to the other grooves, a support for a strip of veneer past which the carrier moves, means for feeding the veneer forward into the transverse grooves of the carrier, as they are successively brought opposite the veneer by the movement of the carrier, and means for cutting off each portion of the veneer so projected into each groove of the carrier, substantially as and for the purpose described.

6. In combination with a movable splint-carrier having a series of transverse splint-holding grooves and a tape-receiving groove at right angles to and deeper than the other grooves, a veneer-supporting table past which the carrier moves, having a portion projecting into the tape-receiving groove, means for feeding the veneer forward into the transverse grooves in the carrier, as they are successively brought opposite the veneer by the movement of the carrier, and means for cutting off the portion of the veneer so projected into each groove in the carrier, substantially as and for the purpose described.

7. In combination with a movable carrier, having a series of transverse splint-holding grooves and a tape-receiving groove at right-angles to and deeper than such transverse grooves, a veneer-supporting table, past which the carrier moves, having a portion extending into the tape-receiving groove in the carrier, and a transverse knife-edge-receiving groove, means for feeding a strip of veneer on the table forward, to cause it to project into the transverse grooves in the carrier, as such grooves are brought successively up to a certain point by the travel of the carrier, and a traveling knife to cut off the portions of the veneer so projected into the grooves of the carrier, substantially as and for the purpose described.

8. In combination with a movable carrier having a series of transverse splint-holding grooves, means for feeding a sheet of veneer to cause it to project into the carrier-grooves, with its forward edge transverse to the carrier and substantially parallel with the grooves as they are successively brought to a certain position by the travel of the carrier, and a veneer-cutting knife moving close to the face of the carrier, so as to cut off the portions of the veneer which are projected into the grooves of the carrier, substantially as and for the purpose described.

9. In combination with a movable carrier, having a series of transverse splint-holding grooves, feed devices to feed a strip of veneer forward into each one of the carrier-grooves as it is brought opposite the veneer by the movement of the carrier so that the forward portion of the veneer will be seated in the groove transverse to the carrier, and a reciprocating knife moving across the path of the veneer close to the face of the carrier, and means for actuating such knife each time that the veneer is moved into a carrier-groove so as to cut off the part of the veneer seated in such groove, substantially as and for the purpose described.

10. In combination with a movable carrier having a series of transverse splint-holding grooves with their forward sides beveled or inclined, feed devices to feed a strip of veneer forward into the grooves, as they are successively brought, by the movement of the carrier, into position to receive the veneer, a knife to cut off the portion of the veneer fed into each groove, moving close to the face of the carrier so as to cut the veneer transversely and to sever the part which rests in the carrier-groove from the rest of the strip of veneer outside of the groove leaving such part in the form of a splint lying transversely in the groove, and means for actuating such knife, substantially as and for the purpose described.

11. In combination with a movable grooved splint-holding carrier, a support for a strip of veneer, one or more rapidly-revolving feed-rolls, to feed the veneer on the support toward the carrier with its forward edge transverse to the carrier, and substantially parallel with the grooves in the latter, a cutter to cut the veneer close to the face of the carrier, and means for actuating it to cut the veneer, each time that the latter is fed into a carrier-groove after the veneer has been fed into the groove, substantially as and for the purpose described.

12. In combination with a series of parallel grooved splint-carriers having corresponding splint-holding grooves, means for moving such carriers, means for feeding into the grooves of the carriers a strip of veneer of a width equal to the length of a series of splints, sufficient in number to afford one splint for each carrier, a cutter to cut off the veneer close to the face of the carriers, means for actuating such cutter to cause it to cut the veneer each time that it has been fed into the grooves of the carrier, feed mechanism to feed the veneer into the grooves of the carrier, and means for cutting the splints transversely between the carriers, substantially as and for the purpose described.

13. In combination with two parallel grooved movable splint-carriers, means for feeding into the corresponding grooves of the two carriers, a strip of veneer of a width equal to the length of two match-splints, a cutter to cut the veneer transversely, close to the face of the carriers after it has been fed into the grooves of the latter, and a second cutter to divide the splints between the two carriers, substantially as and for the purpose described.

14. In combination with a series of parallel transversely-grooved splint-carriers and means for moving them, means for feeding a strip of veneer into the grooves of the carriers, a reciprocating knife adapted to cut the veneer close to the carriers, after it has been fed into the latter, a splint-dividing knife, moving with the former knife, to cut the splints in two between the carriers, and means for actuating the knives so that the veneer-cutting knife will cut the veneer each time that the latter has been fed forward into the corresponding grooves of the two carriers, substantially as and for the purpose described.

15. In combination with a movable carrier with transverse splint-holding grooves, and a tape-groove at right angles to the other grooves, a coiling tape, a coiling device to coil up such tape, means for actuating such device, a support for a strip of veneer, means for feeding such veneer toward the carrier, so that it will be projected into each transverse groove in the carrier, as such groove is brought opposite the veneer by the motion of the carrier, and means for cutting off each portion of the veneer so projected into a carrier-groove, substantially as and for the purpose described.

16. In combination with a movable carrier with transverse splint-holding grooves and a tape-groove at right angles to such grooves, a coiling tape passing through a portion of the tape-groove, a support for a strip of veneer, means for feeding such strip forward toward the carrier, to cause it to enter each transverse carrier-groove, as it is brought up to the veneer by the travel of the carrier, means for cutting off from the veneer each portion so projected into a carrier-groove, a second coiling tape above the splints in the carrier-grooves, and a rotary coiling device with which the two tapes are connected, substantially as and for the purpose described.

17. In combination with a rotary wheel having a series of transverse splint-holding grooves, and a circumferential tape-receiving groove, a coiling tape, a support for a strip of veneer, means for feeding such veneer toward the grooved wheel, so that it will enter each transverse groove therein, as such groove is brought up opposite the veneer by the rotation of the wheel, cutting mechanism to cut the veneer close to the face of the wheel, each time that the veneer has been moved to cause it to enter a wheel-groove, and a coiling device with which the coiling tape is connected, substantially as and for the purpose described.

18. In combination with a rotary wheel having a series of transverse splint-holding grooves, a reciprocating head moving over the face of the wheel close thereto, a knife carried by such head, means for feeding a strip of veneer into the grooves of the wheel, and means for actuating the head to cause the knife to cut the veneer, after it has been fed into a groove in the wheel, substantially as and for the purpose described.

19. In combination with a rotary wheel having a series of transverse splint-holding grooves, means for feeding a strip of veneer into such grooves, as they are brought successively opposite a certain point, a head having its inner or under side close to the face of the wheel, a veneer-cutting knife on the head, and means for reciprocating the head in a curved path substantially concentric with the wheel, substantially as and for the purpose described.

20. In combination with a rotary wheel having a series of transverse splint-holding grooves and a circumferential coiling-tape-receiving groove, means for feeding a strip of veneer into the transverse grooves, as they are successively brought by the rotation of the wheel up to a certain point, a swinging frame moving in a path concentric with the wheel, means for swinging such frame back and forth, a head carried by such frame moving close to the face of the wheel, and a knife on such head having its edge moving close to the wheel-face and across the path of the veneer from the veneer-feeding means, a coiling tape passing through a part of the circumferential groove in the wheel, and coiling devices for taking the tape from the wheel and coiling it up, substantially as and for the purpose described.

21. In combination with a rotary wheel having a series of transverse splint-holding grooves, means for feeding a strip of veneer into such grooves as they are successively brought up to the path of the veneer by the rotation of the wheel, a head reciprocating in a path concentric with the face of the wheel, and having a plate-like extension curved in a line substantially concentric with the wheel-face, a cutter moving with the head, having its edge adapted to cut through the veneer close to the wheel-face, and means for reciprocating such head, substantially as and for the purpose described.

22. In combination with two rotary wheels having corresponding splint-holding grooves, means for feeding a strip of veneer into the grooves of the wheels as they are brought successively up to a given point, a reciprocating head moving close to the faces of the wheels, a transverse cutter on the head to cut the veneer after it has been fed into the wheel-grooves, a second cutter moving with the head, arranged to cut the splints in the wheel-grooves in two at a point between the wheels, and means for reciprocating the head, substantially as and for the purpose described.

23. In combination with a movable carrier having a series of transverse splint-holding grooves of a depth to receive and hold a splint, a table to support a sheet of veneer, a feed-roller to engage one side of the veneer upon the table, a second feed-roller to engage the other side of the veneer, journaled in a swinging weighted frame, gearing connecting the two rollers, means for rotating one of the rollers, and means for cutting across the sheet of veneer operating close to the face of the grooved carrier, so as to sever from the rest of the veneer the portion of the veneer seated transversely in any one of the carrier-grooves, substantially as and for the purpose described.

24. In a feed mechanism, the combination of a pair of rollers, a movable support for one roller, a projection connected with said support, and an eccentric journaled on the shaft of the other roller, and engaging said projection, substantially as and for the purpose described.

25. In combination with a movable carrier having a series of splint-holding grooves, a suitable table for supporting a sheet of veneer, having a projection alongside of the grooved part of the carrier, and a knife-edge-receiving groove in a plane close to the surface of the carrier, means for feeding the veneer over the table and into the carrier-grooves, as the latter are brought successively opposite the path of the veneer, and a cutting device having its knife-edge adapted to cut the veneer when fed into the grooves, and enter the groove in the table.

26. In combination with a suitable table for supporting a sheet of veneer, a movable carrier with splint-holding grooves, means for feeding the veneer to cause it to project into the carrier-grooves, as they are brought successively opposite the end of the veneer, a knife and means for actuating it, the table having a portion projecting across the path of the knife provided with a groove for the entrance of the knife, that opens beyond the point to which the knife reaches on entering it, substantially as and for the purpose described.

27. In combination with a movable carrier having a series of transverse splint-holding grooves, a table to support a strip of veneer having a portion extending across the path of the knife close to the face of the carrier and provided with a transverse knife-edge-receiving groove with one or more clearing-passages connected with its rear side, means for feeding a strip of veneer over the table and into the carrier-grooves, a reciprocating knife to cut the veneer, and means for removing such knife to cause it to pass into and from the groove in the table, substantially as and for the purpose described.

28. In combination with a movable carrier having splint-holding grooves, a cutter-carrying head, movable to and fro adjacent to the grooved surface of the carrier, a shield also adjacent to such surface, and a projection from the head into an opening in the shield, substantially as and for the purpose described.

29. In combination with a wheel having peripheral, splint-holding grooves, a veneer-feeding mechanism, a cutter-carrying head reciprocating adjacent to the periphery of and concentric with the wheel, a shield also adjacent to said periphery, a projection from the head into an opening in the shield, a tape and a tape-coiling spool, substantially as and for the purpose described.

JOHN F. KAY.
DANIEL HUTCHINSON.

Witnesses:
WALLACE A. DOWNS,
BERTHA DEYO.